(12) United States Patent
Tsui et al.

(10) Patent No.: US 7,919,706 B2
(45) Date of Patent: Apr. 5, 2011

(54) MELODY RETRIEVAL SYSTEM

(75) Inventors: Chi-ying Tsui, Hong Kong (CN); Bertram Shi, Hong Kong (CN); Chi Wai Yung, Hong Kong (CN)

(73) Assignee: Perception Digital Technology (BVI) Limited, Tortola (VG)

( * ) Notice: Subject to any disclaimer, the term of this patent is extended or adjusted under 35 U.S.C. 154(b) by 693 days.

(21) Appl. No.: 11/953,215

(22) Filed: Dec. 10, 2007

(65) Prior Publication Data
US 2008/0148924 A1   Jun. 26, 2008

Related U.S. Application Data

(62) Division of application No. 09/804,069, filed on Mar. 12, 2001, now abandoned.

(60) Provisional application No. 60/188,730, filed on Mar. 13, 2000.

(51) Int. Cl.
*G06F 7/00* (2006.01)
*G06F 17/00* (2006.01)
*G10H 1/22* (2006.01)

(52) U.S. Cl. .............. 84/618; 84/609; 84/616; 700/94; 707/749

(58) Field of Classification Search .................. 707/749; 700/94; 84/609, 615, 616, 618
See application file for complete search history.

(56) References Cited

U.S. PATENT DOCUMENTS

| 4,038,503 | A | 7/1977 | Moshier |
| 4,282,405 | A | 8/1981 | Taguchi |
| 4,633,748 | A | 1/1987 | Takashima et al. |
| 5,038,658 | A | 8/1991 | Tsuruta et al. |
| 5,565,639 | A | 10/1996 | Bae |
| 5,567,162 | A | 10/1996 | Park |
| 5,596,160 | A | 1/1997 | Aoki |
| 5,619,004 | A | 4/1997 | Dame |
| 5,952,596 | A | 9/1999 | Kondo |
| 6,243,672 | B1 | 6/2001 | Iijima et al. |

*Primary Examiner* — Elvin G Enad
*Assistant Examiner* — Andrew R Millikin
(74) *Attorney, Agent, or Firm* — Leydig, Voit & Mayer, Ltd.

(57) ABSTRACT

A music retrieval system which take an input melody as the query. In one embodiment, changes or differences in the distribution of energy across the frequency spectrum over time are used to find breakpoints in the input melody in order to separate it into distinct notes. In another embodiment the breakpoints are identified based on changes in pitch over time. A confidence level is preferably associated with each breakpoint and/or note extracted from the input melody. The confidence level is based on one or more of: changes in pitch, absolute values of a spectral energy distribution indicator, relative values of the spectral energy distribution indicator, and the energy level of the input melody. The process of matching the input melody with songs in the music database is based on minimizing a cost computation that takes into account errors in the insertion and deletion of notes, and penalizes these errors in accordance with the confidence levels of the breakpoints and/or notes.

25 Claims, 10 Drawing Sheets

```
                    60A              60B            60C
56               ⌐‾‾‾‾‾‾‾‾‾‾‾‾‾‾‾⌐  ⌐‾‾‾‾‾‾‾‾‾⌐  ⌐‾‾‾‾‾‾‾‾‾‾‾‾‾‾‾‾‾⌐
 ⌐ P : ------2212232998989995565565---11111111111----33433344333387788877777-----
57
 ⌐ E : 11211155756754845564574565741121111221122212329878878987789876789874211111
58
 ⌐ S1: -------HHHHHHHHHHHHHHHHHHHHHH----HHHHHHHHHH----HHHHHHHHHHHHHHHHHHHHHHH-----
59
 ⌐ S2: -------HHHHHHHHHHHHHHHHHHHHHH----------------------HHHHHHHHHHHHHHHHHHH-----
101
 ⌐ B : ---x------^-------^-----x-----------------x-----------^-------x-----
```

Fig. 3

MELODY RETRIEVAL SYSTEM

RELATED APPLICATIONS

This application claims priority from U.S. provisional application Ser. No. 60/188,730, entitled, Humming Search Music Recognition System, filed Mar. 13, 2000, which application is hereby incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF INVENTION

The invention relates to the field of music retrieval systems and more particularly to retrieval systems which take a melody vocalized by a user as the query.

BACKGROUND OF INVENTION

With the proliferation of musical databases now available, e.g., through the Internet or jukebox machines, consumers now have ready access to individual songs or pieces of music available for purchase or listening. However, being surrounded by so much music, it is often difficult for a listener to catch or remember the title of a song or the artists name. Nevertheless, if the song is of interest to the listener, he or she can often remember at least a portion of its musical melody. The following disclose retrieval of information relating to audio data from a hummed or sung melody taken as a query: U.S. Pat. No. 6,121,530 (Sonoda); A. Ghias, J. Logan, D. Chamberlin, B. C. Smith, *Query by Humming, Musical Information Retrieval in an Audio Database*, Multimedia '95, San Francisco, pp. 231-236; N. Kosugi, Y. Nishihara, S. Kon'ya, M. Yamamuro, K. Kushima, *Music Retrieval by Humming, Using Similarity Retrieval over High Dimensional Feature Vector Space*, 1999 IEEE Pacific Rim Conference on Communications, Computers and Signal Processing, Page(s) 404-407; and P. V. Rolland, Raskinis, J-G Ganascia, *Musical Content-based Retrieval, an overview of the Melodiscov Approach and System.*

The invention provides an approach different from those described in the above-mentioned documents in identifying a musical composition in response to a query that is a melody.

SUMMARY OF INVENTION

The invention provides methods and systems for retrieving musical selections or data identifying musical selections based on a digital version of a melody which originated from a sound or electronic source, e.g., a person humming, singing, whistling or otherwise vocalizing the melody; a musical instument's audio or electronic output; an analog or digital recording of the melody, etc. Breakpoints between notes are identified as are distinct notes represented by pitch. In addition, one or more confidence levels may be associated with the input melody.

A value or confidence level may be assigned to each breakpoint to provide a measure of confidence that the identified breakpoint is in fact a breakpoint. Similarly, a value or confidence level assigned to each note may provide a measure of confidence that the identified note is a single note, e.g., does not include two or more notes.

One aspect of the invention provides a method and system for converting a digitized melody into a series of notes. The method and system receive a digitized representation of an input melody, identify breakpoints in the melody in order to define notes therein, determine a pitch and beat duration for each note of the melody, and associate a confidence level with each breakpoint, or each note, or both.

The confidence levels associated with breakpoints and/or notes may be determined using different techniques, some of which are described herein.

In the preferred embodiment, segmentation of the input melody into distinct notes divided by breakpoints is based on changes or differences in the distribution of energy across the frequency spectrum over time. The confidence levels associated with each breakpoint and/or note may be based on changes in pitch, as well as absolute and relative values of a spectral energy distribution indicator.

One aspect of the invention provides a method and related system for converting a digitized melody into a sequence of notes. Generally speaking, the method involves estimating breakpoints in the input melody based on changes in the distribution of energy across the frequency spectrum over time. In the preferred embodiment, the melody is segmented into a series of frames. A spectral energy distribution (SED) indicator is computed for each frame and at least initial breakpoints estimates are derived based on the SED indicator. Notes are defined between adjacent breakpoints.

Another aspect of the invention provides another method and related system for converting a digitized melody into a sequence of notes. The method includes: segmenting the melody into a series of frames; computing the auto-correlation of each frame; estimating the pitch of each frame based on (i) a pitch period corresponding to a shift where the auto-correlation coefficient associated with the frame is relatively large and (ii) the closeness of the pitch estimate to estimates in one or more adjacent frames; and estimating breakpoints in the melody based on changes in the pitch estimates, wherein the notes are defined between adjacent breakpoints.

Another aspect of the invention provides a method and related system for identifying breakpoints in a digitized melody. The method includes: segmenting the melody into a series of frames; computing the auto-correlation of each frame; estimating the pitch of each frame based on (i) a pitch period corresponding to a shift where the auto-correlation coefficient associated with the frame is relatively large and (ii) the closeness of the pitch estimate to estimates in one or more adjacent frames; determining regions of said melody where pitch estimates are likely to be invalid; and identifying the breakpoints in the melody based on transitions between frames having valid pitch estimates and transitions having invalid pitch estimates.

Other aspects of the invention relate to methods and systems for determining confidence levels for breakpoints and/or notes in a waveform representing a melody. These methods include segmenting the waveform into a series of frames, wherein adjacent breakpoints encompass one or more sequential frames, each note being defined between adjacent breakpoints. Then, at least one of the following three steps may be executed: (a) computing a spectral energy distribution (SED) indicator for each frame; (e) estimating the pitch of each frame; and (c) determining the energy level of each frame. The confidence levels may be based on any of the following three characteristics: (i) the SED indicator, (ii) changes in pitch, and (iii) the energy level.

An entry may be retrieved from a music database of sequences of pitches and beat durations in accordance with a match function that receives the digitized melody obtained from a melody source as described herein. A method and system for implementing the retrieval may determine a score for each entry based on a search which minimizes the cost of matching the pitches and beat durations of the melody and the entry, and which may be based on minimizing a cost computation which may take into account one or more note insertion and/or deletion errors and penalize the cost in accordance with confidence levels pertaining thereto.

Another aspect of the invention relates to a method and system of retrieving at least one entry from a music database, wherein each entry is associated with a sequence of pitches and beat durations. The method includes receiving a digitized representation of an input melody; identifying breakpoints in the melody in order to define notes therein; associating each breakpoint and/or note with a confidence level; and determining a pitch and beat duration for each note of the melody. Then, a score is determined for each database entry based on a search which minimizes the cost of matching the pitches and beat durations of the melody and the entry. The search considers at least one deletion or insertion error in a selected note of the melody and, in this event, penalizes the cost of matching based on the confidence level of the selected note or breakpoint associated therewith. At least one entry may then be presented to a user based on its score.

BRIEF DESCRIPTION OF DRAWINGS

The foregoing and other aspects of the invention will become more apparent from the following description of preferred embodiments thereof and the accompanying drawings, which illustrate, by way of example, the principles of the invention. In the drawings:

FIG. 3 is a schematic diagram illustrating some of the processing activities of the melody-to-note conversion subsystem with respect to a sample input melody;

DETAILED DESCRIPTION OF PREFERRED EMBODIMENTS

1. System Overview

Figure 1:
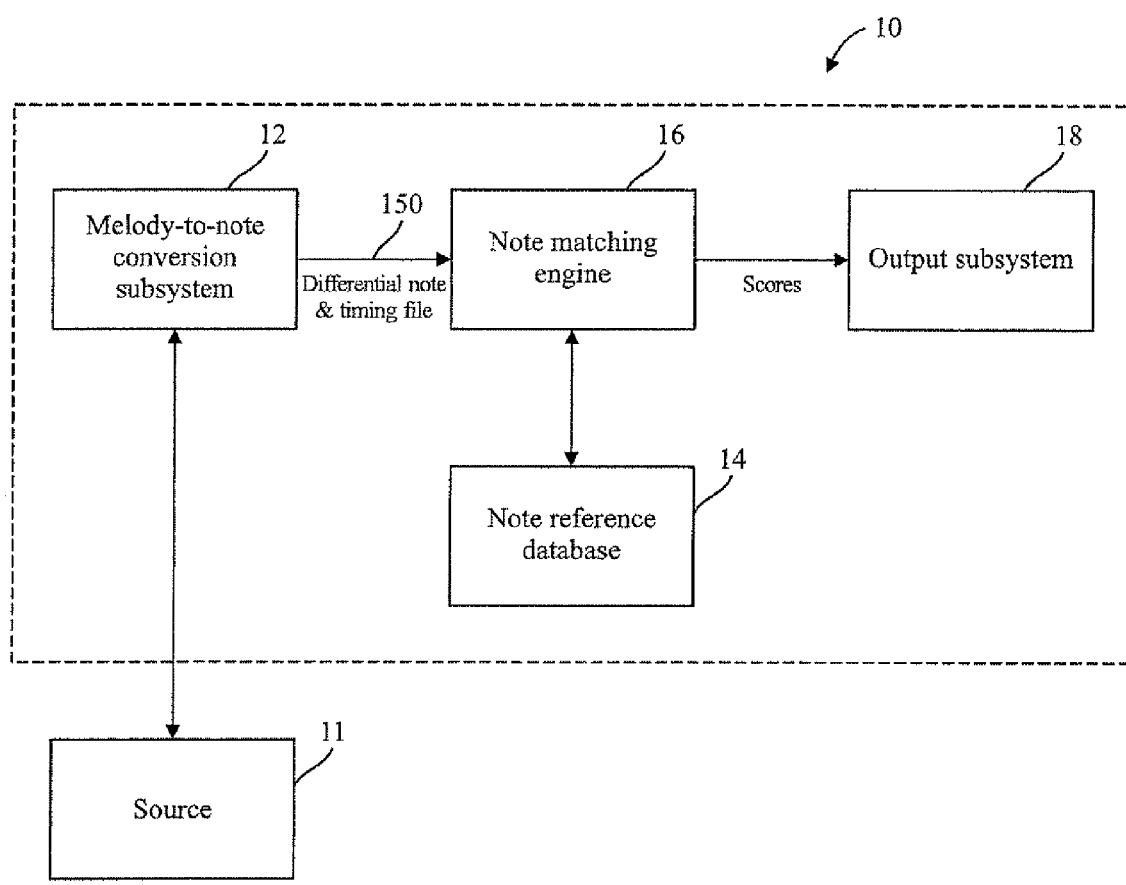
FIG. 1 is a system block diagram showing the major components of a music recognition system according to a preferred embodiment of the invention.

FIG. 1 shows a music recognition system 10 which comprises four major components: a melody-to-note conversion subsystem 12; a music reference database 14; a note-matching engine 16; and an output subsystem 18.

The music recognition system 10 takes a digitized input melody 20 obtained from a source 11 as a query. For reasons explained in greater detail below, it is preferred that the input melody originate from a user in the form of humming, particularly through intonations of notes that are combinations of a semi-vowel, such as "l", and vowel such as "a" (i.e., notes in the form of "la"). However, the input melody may also comprise many other forms of humming, singing, whistling or other such types of music-like vocalization. The input melody may also originate from a musical instrument(s). In these cases the source 11 represents circuitry for recording and digitizing the user's voice or the musical instrument. Alternatively, the input melody may originate from a recording of some kind, in which case the source 11 represents the corresponding player and, if necessary, any circuitry for digitizing the output of the player. The digitized input melody 20 is supplied to the melody-to-note conversion subsystem 12.

The melody-to-note conversion subsystem 12 converts the digitized input melody 20 into a sequence of musical notes characterized by pitch, beat duration and confidence levels. This is accomplished through spectral analysis techniques described in greater detail below which are used to find "breakpoints" in the input melody in order to separate it into distinct notes. The pitch of each note is determined by the periodicity of the input melody waveform between the note-defining breakpoints. The beat duration of each note is extracted from the separation of the notes, i.e., the duration is determined from the time period between breakpoints. To compensate for error in the separation, each breakpoint is preferably associated with a confidence level, which indicates how likely the breakpoint is a valid breakpoint. A confidence level is preferably also associated with each note to indicate how unlikely the identified note actually contains more than one note. The output of the melody-to-note conversion subsystem 12 is a differential note and timing file 150 which comprises the relative difference in pitch and the relative difference in beat duration of consecutive notes. The difference is preferably expressed in terms of the logarithm of the ratio of the pitch and duration values of the consecutive notes. The reason for using pitch and duration differences is discussed further below.

The music reference database 14 stores the differential note and timing files of all music or songs searchable by the system 10. Each such file preferably comprises a short, easily recognizable segment of a song or music, i.e., the so-called "signature melody", but may alternatively encompass an entire song or piece of music. These files may be generated in the first instance by the melody-to-note conversion subsystem 12.

The note matching engine 16 compares the differential note and timing file 150 from the melody-to-note conversion subsystem 12 with songs or pieces of music in the music reference database 14, which are stored in a similar file format. Since different users may vocalize or play a song or piece of music in different key and different tempo, the system 10 does not compare the pitch of the uttered melody and the reference files directly, but rather the ratio in pitch between consecutive notes. For the same melody, if the scale is shifted to a different frequency, the ratio in the frequency (pitch) of the consecutive notes will be the same. Similarly, to normalize for differences in tempo, the system 10 compares the relative duration of the consecutive notes. The note matching engine 16 employs dynamic programming techniques described in greater detail below for matching the differential note and timing file 150 with similarly formatted files stored in the music database 14. These techniques can compensate for pitch errors and insertions or deletions of notes by the user or the melody-to-note conversion subsystem 12. The engine 16 calculates a matching score for each song in the database 14.

The output subsystem 18 sorts the songs or music in the database 16 based on the matching scores. The highest ranked song(s) or piece(es) of music is selected for presentation to the user.

2. Melody to Note Conversion 2.1. Overview

Figure 2:
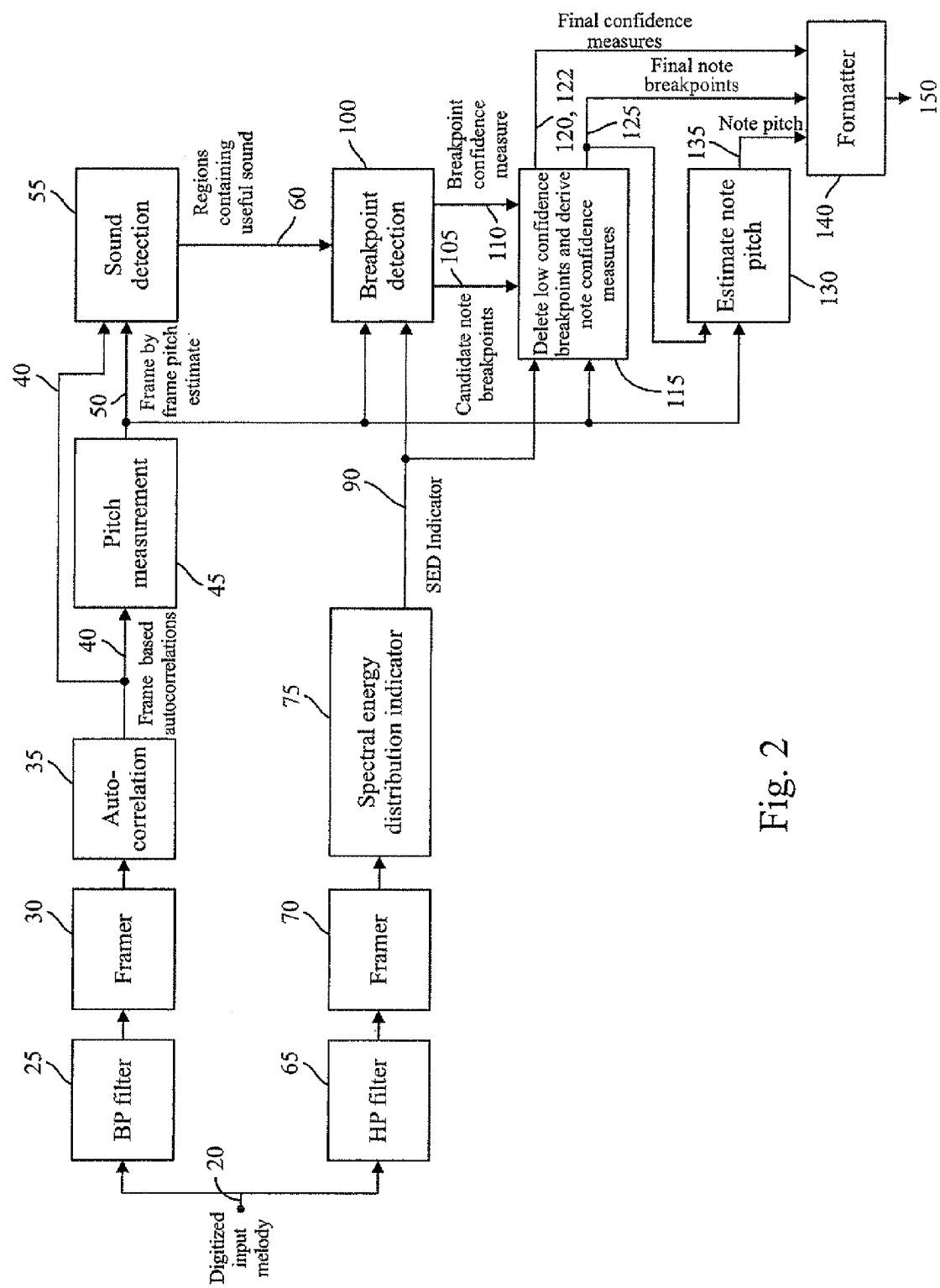
FIG. 2 is a functional block diagram showing the processing blocks of a melody-to-note conversion subsystem employed in the music recognition system of FIG. 1.

FIG. 2 shows the functional blocks of the melody-to-note conversion subsystem 12. The subsystem 12 generates the following data from the digitized input melody 20, which is used to construct the output differential note and timing file 150:

a list of breakpoints, which indicate the boundaries between distinct notes in the input melody; and a list of pitches, each pitch being associated with each note between two adjacent breakpoints.

In addition, the subsystem 12 determines one or more confidence levels related to breakpoints and/or notes, and uses one or more of those confidence levels in the construction of the differential note and timing files 150. Specifically, in the preferred embodiment, a confidence measure or level is associated with each breakpoint that indicates the probability that the breakpoint is valid. A confidence measure or level may also be associated with each identified note, which indicates the likelihood that the identified note does not contain more than one note.

Breakpoints are intended to indicate points of silence or points of inflection (i.e., alteration in pitch or tone of the voice) in the input melody. The embodiments described herein use more than one technique to identify a breakpoint and determine its confidence level by considering how "closely" the various techniques have collectively identified a breakpoint. For example, if all techniques have identified a breakpoint at the same particular point in the input melody, the confidence level associated with that breakpoint is relatively high. Conversely, if one or less than all of the techniques do not identify a breakpoint at or near that particular point in the melody, the confidence level will be lower.

In the illustrated embodiment of FIG. 2, three tonal characteristics are considered in identifying breakpoints:

silence, or conversely regions of the input waveform containing humming (represented by output arrow 60);

changes in pitch (represented by output arrow 50); and changes or differences in the distribution of energy across the frequency spectrum over time (represented by output arrow 90).

The first two characteristics should be intuitively understood for their value in identifying a breakpoint. The last item is a breakpoint characteristic due to the typical nature of human vocalization. More particularly, as mentioned, users can hum melodies using notes which are combination of a semi-vowel, such as "l" and a vowel, such as "a", i.e. "la.". When enunciating the semi-vowel, it has been found that the mouth is typically actuated in such as way that results in the sound energy being concentrated at lower frequencies, as compared with the frequency distribution of the sound energy during the vowel. The preferred embodiment takes advantage of this observation, as discussed in greater detail below.

Notes are defined between two adjacent breakpoints. The embodiments described herein can use one or more than one technique to determine a confidence level associated with each note, which indicates the likelihood that the note contains only one note from the input melody. Because this is equivalent to the confidence that a breakpoint was not missed inside the note, the note confidence measures can be derived from the same quantities as used for breakpoint confidence measures, except with an inverse relationship. For example, a large and rapid change in pitch near a breakpoint increases the confidence in that breakpoint. However, large and rapid changes in pitch in the interval between two breakpoints decreases the confidence that a breakpoint has not been missed. As with breakpoint confidence measures, note confidence measures may be based on one or more different indicators.

2.2. Detailed Discussion

One set of processing steps of the subsystem 12 begins by filtering the input melody 20 (alternatively referred to as the "input waveform") with a bandpass filter 25 in order to attenuate frequency components that lie outside the range of expected pitches.

Next, a framer 30 segments the filtered input waveform into a sequence of "frames" of equal period, e.g., 1/32 of a second. Each frame contains a short portion of the total filtered input waveform. Adjacent frames may contain overlapping parts of the filtered input waveform to provide for some degree of continuity therebetween, as known in the art per se. The overlap is preferably a tunable parameter and may be expressed as a percentage. Every part of the filtered input waveform is thus represented in at least one frame.

The auto-correlation of each frame is then computed at block 35. The auto-correlation $c[l]$ of a waveform $x[n]$ is defined as the sequence $$c[l] = \sum_{k=-\infty}^{\infty} x[k]x[l+k].$$

This provides a measure of the similarity of a signal with a shifted version of itself, where the amount of shift is given by l. The auto-correlation is related to the spectral energy distribution of x[n]. The auto-correlation computation will yield a multitude of auto-correlation coefficients for each frame. As known in the art, peaks in the auto-correlation provide an indication of the periodicity or pitch of a waveform, which in is case is the part of the filtered input waveform contained in each frame.

Block 45 provides a frame-by-frame pitch estimate 50. This is carried out by first identifying the "largest" peaks in the auto-correlation of each frame, e.g., the top 2-10 auto-correlation values. This yields a number of "pitch period candidates". The estimated pitch period of the frame is determined by selecting the pitch period candidate that corresponds to a large auto-correlation peak while simultaneously considering how "close" the pitch period candidate is to pitch period estimates in one or more adjacent frames. The adjacent frames may be preceding or receding frames, or both. The preferred embodiment employs a cost function which weights the size of the auto-correlation peak and the closeness of the corresponding pitch period candidates to pitch period estimates in adjacent frames. This analysis presumes that the human vocal tract cannot radically alter pitch in the short time period represented by a frame, e.g., 1/32 second. If no such pitch period can be found from among the possible pitch period candidates, the pitch measurement block 45 labels that frame as containing no pitch. In this manner the possibility that there is no reliable pitch in the frame is also considered.

For example, let $p_i$ be the pitch period in frame i, where $p_i$ is either one of the identified pitch period candidates or a value indicating the lack of any identified pitch. An example cost function is $$\sum_i \{D(p_{i-1}, p_i) + (1 - c[p_i])\}$$

where the sum is taken over all frames in the input melody. The function $D(p_{i-1}, p_i)$ measures the difference between adjacent pitch period estimates, for example $D(p_{i-1}, p_i)=\alpha|\ln(p_i)-\ln(p_{i-1})|$ where $\alpha=2/\ln 2$. If either $p_i$ or $p_{i-1}$ indicates that there is no identified pitch, $D(p_{i-1}, p_i)$ is set equal to a constant, e.g. 4. The value $c[p_i]$ is the normalized autocorrelation at the shift corresponding to $p_i$. If $p_i$ indicates that there is no identified pitch, then we assign $c[p_i]=0$. The exact sequence of pitch period candidates minimizing this cost function can be computed by a dynamic programming procedure similar to that described in Section 3 on the note matching engine.

Block 55 seeks to detect regions 60 of the input waveform containing useful sound such as humming or music (as opposed to silence or noise), based on the frame-by-frame pitch estimate 50 and the frame-based auto-correlation 40. The manner in which this is preferably carried out is exemplified in FIG. 3. In FIG. 3, each position along the horizontal axis represents a frame, with the "P" line 56 representing input pitch estimates 50 (FIG. 2) and the "E" line 57 representing the energy of each frame, as determined from the frame-based auto-correlation 40 (FIG. 2). In this example (FIG. 3), the pitch estimates and energy estimates have quantized values ranging from 1-9. The sound detection block 50 first looks for regions that may have useful sound because a valid pitch estimate was computed in the block 45. This is shown in line "S1" 58 of FIG. 3 where the symbol 'H' represents useful sound. Next, the sound detection block 55 considers the average energy of the frames in each region. Where the average energy is below a specified threshold, the region is considered to have no useful sound. This is shown in line "S2" 59 of FIG. 3. In the illustrated example, the block 50 thus considers region 60B of the input waveform as being silent. Conversely, regions 60A and 60C are considered to contain useful sound. Regions containing useful sound are sent to a breakpoint detection block 100.

The breakpoint detection block 100 (FIG. 2) also receives input from a parallel processing path comprising a high-pass filter 65, a framer 70 and a spectral energy distribution indicator computation block 75. The high-pass filter 65 filters the input waveform 20 in order to emphasize high frequency information that has been found to be useful in detecting the breakpoints between notes. The framer 70 slices the filtered input waveform into frames, which are identical in scope and temporal position to the frames generated by framer 30.

The spectral energy distribution ("SED") indicator computation block 75 computes a numerical measure or SED indicator 90, which indicates how the sound energy is distributed in each frame. The SED indicator preferably assumes relatively high values if the sound energy is concentrated near high frequencies and relatively low values if the sound energy is concentrated near other frequencies, as described in greater detail below. For example, a 4 kHz frequency range may be considered with high frequencies deemed to those approaching 4 kHz and low frequencies deemed to be those near zero kHz.

The breakpoint detection block 100 finds initial estimates for the locations of note breakpoints (i.e., "candidate" breakpoints) 105 and computes a confidence measure 110 associated with each candidate breakpoint 105. This confidence measure varies between 0 and 1, where a value near 1 indicates that the breakpoint is very reliable.

The breakpoint detection block 100 operates on regions of the input waveform supplied by the sound detection block 55. In FIG. 3, for example, these would be regions 60A and 60C. The detection block 100 assigns breakpoints to the beginning and end frames of each region. Thus, the transitions between a frame with no pitch estimate and a frame with a valid pitch estimate is one method that may be used to identify breakpoints. These breakpoints are given a confidence level of 1. This is exemplified in FIG. 3 by the "x" symbol in the "B" line 101.

Within each region, the block 100 detects candidate breakpoints based on minima present in the SED indicator 90. These are exemplified in FIG. 3 by the """ symbol in the "B" line 101. The reason for this can be understood on an intuitive level by considering a melody waveform that consists of a sequence of notes, each of which is sung as "la." The vowel part "a" is typically longer in duration than the consonant part and is usually better defined spectrally. Therefore, it should provide the most reliable information for pitch extraction. Segmentation can be performed if the "l" part of each "la" can be detected. Because "l" is a semivowel, it typically contains strong pitch periodicity. However, because of the constriction of the mouth during production, it contains less overall energy and less high frequency resonant structure.

Figure 4A:
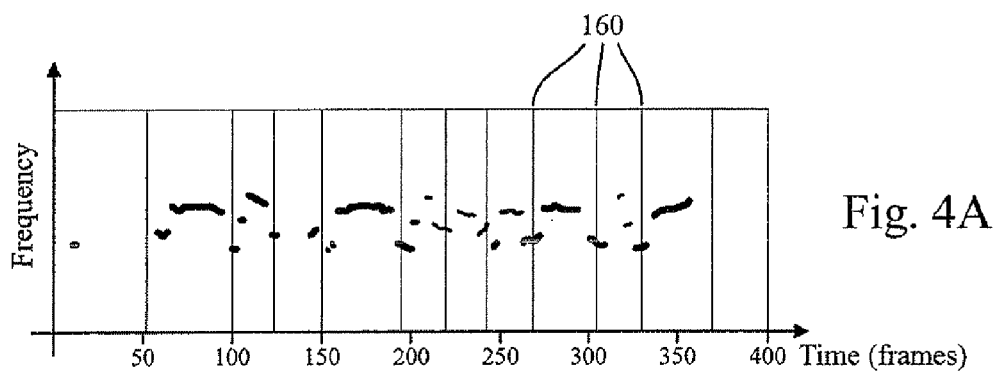
FIG. 4A is a normalized energy spectrogram, plotted against time and frequency, of a sample input melody (which sample differs from the melody referenced in FIG. 3)

This can also be seen through experimental observation. For example, FIG. 4A is a spectrogram of a normalized energy spectrum for a sample melody hummed using "la" notes. Note that FIG. 4A relates to a sample melody that differs from that shown in FIG. 3.) More particularly, the normalized energy spectrum is shown as a gray scale image wherein normalized energy values approaching a maximum value are white and values near zero are black. The vertical axis of the spectrogram corresponds to frequency and the horizontal axis corresponds to time. Thus, a vertical cross-section of the spectrogram essentially corresponds to one frame and represents the normalized energy spectrum of the frame as a function of frequency. The energy spectrum of a frame is defined as the squared magnitude of the Discrete Fourier Transform of each frame, and always assumes a positive value. The normalized energy spectrum of a frame is obtained by normalizing the energy spectrum of the frame by the total energy in the frame; i.e., the sum of the energy spectrum over all frequencies in the frame.

A strong banding structure (i.e., generally horizontal white lines) exists between frame nos. 50 and 350. The rest is basically noise. The bands are harmonics (multiples) of the pitch frequency and move closer and farther apart as the pitch changes. The dominant band in each frame is not the pitch frequency, but some harmonic of it. Which harmonic is emphasized depends strongly upon the shape of the vocal tract and mouth at the time instant.

Figure 4B:
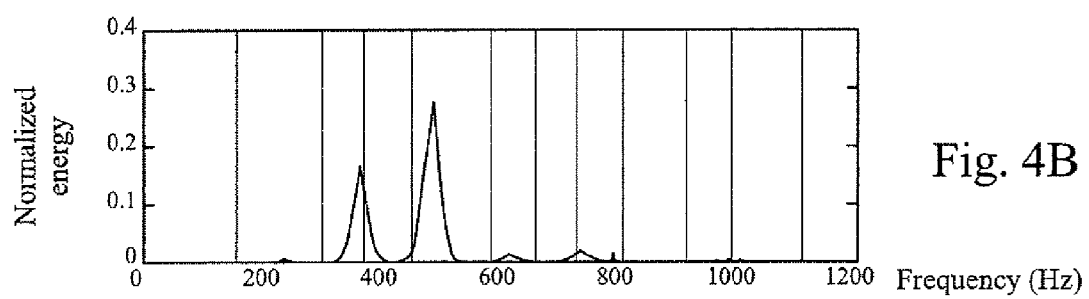
FIG. 4B is a graph of the normalized energy spectrum at a first time frame in FIG. 4A plotted against frequency.
Figure 4C:
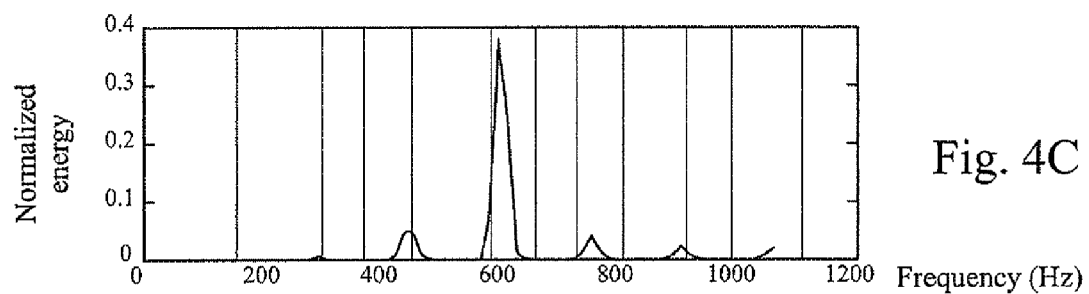
FIG. 4C is a graph of the normalized energy spectrum at a second time frame in FIG. 4A plotted against frequency.

There are about ten notes in FIG. 4A with the breakpoints being indicated by the vertical white lines 160 in the image. (Lines 160 are not part of the spectrogram but are merely used to indicate the position of the breakpoints in the image.) Breakpoints between notes can be seen where the dominant band shifts lower because constrictions in the vocal tract reduce the amount of high frequency energy uttered. This is shown more clearly in FIGS. 4B and 4C. FIG. 4B shows the normalized energy spectrum plotted versus frequency for frame no. 150, which is a near breakpoint. FIG. 4C shows the same kind of plot for frame no. 170, which is in the middle of a hummed note. A shift in the energy distribution to higher frequencies is clearly evident. Note that these plots are essentially a cross-section through a vertical slice of the spectrogram illustrated in FIG. 4A.

The SED indicator 90 represents the shift in energy distribution. This a numerical measure which combines the spectral energies in each frame in such a way that the value of that measure is large if the energy distribution is concentrated in certain frequency bands and small if the energy distribution is concentrated in others. There are a variety of ways to compute the SED indicator.

In one implementation, the SED indicator 90 can be computed as the first moment of the energy spectrum in each frame divided by the zero$^{th}$ moment. More particularly, let X(k) be the energy spectrum at frequency bin k, the corresponding spectral energy distribution measure is given by $$\frac{\sum_k k X(k)}{\sum_k X(k)}.$$

Figure 5A:
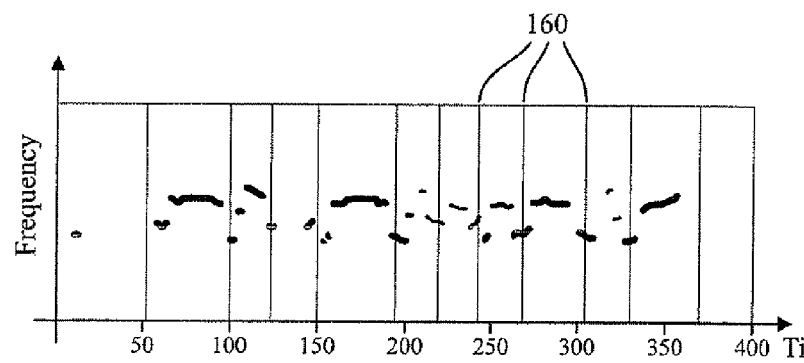
FIG. 5A is identical to FIG. 4A (and provided on the same drawing sheet as FIGS. 5B and 5C for reference purposes)
Figure 5B:
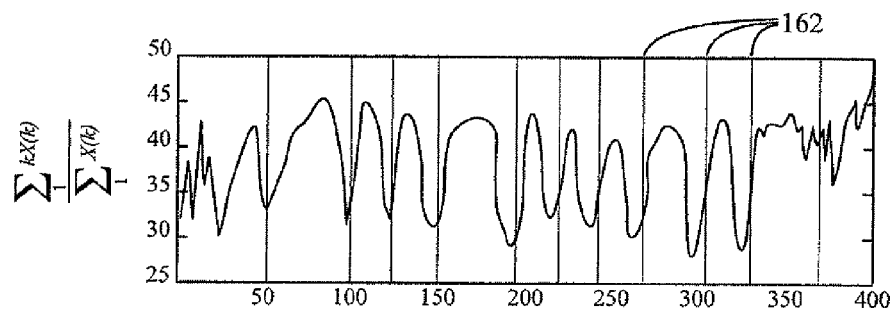
FIG. 5B is a graph of a spectral energy distribution indicator, computed in a first manner, which is based upon the spectrogram of FIG. 5A.

The summation is carried out over all frequency bins from 0 (DC) up to the frequency bin corresponding to the Nyquist frequency. Frequency bins past the Nyquist frequency contain no additional information due to aliasing. This results in large values if X(k) is concentrated around large frequencies (large k). The graph of FIG. 5B plots the SED indicator (when computed as just described) for the sample input melody of FIG. 4A, i.e., for all frames. In FIG. 5B, vertical lines 162 indicate the positions of breakpoints. FIG. 5A repeats FIG. 4A to facilitate comparison. Note that the SED indicator drops to minimum values at or near the breakpoints.

Figure 5C:
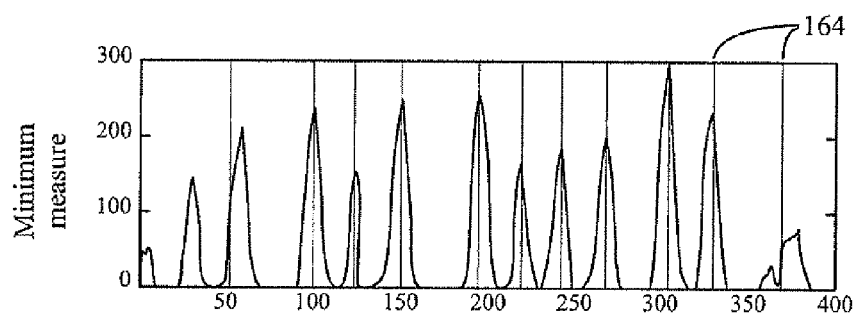
FIG. 5C is a graph of a "minimum measure", as discussed in greater detail below, which is based on the spectral energy distribution indicator shown in FIG. 5B.

Based on the SED indicator 90, the breakpoint detection block 100 preferably derives a "minimum measure" at each frame, which is positive if there is a local minimum in the SED indicator "near" the corresponding frame, and zero otherwise. In this context the number of "near" frames is, for example, 15 frames before and 15 frames after the present frame. By considering or integrating such information over a number frames the SED indicator can be smoothed. The amplitude of the minimum measure is larger the "deeper" the local minimum. A linear relationship is preferably employed for determining the amplitude of the minimum measure but other types of relationships can be employed in the alternative such as power, exponential, and logarithmic relationships. FIG. 5C shows an example of the minimum measure for the SED indicator shown in FIG. 5B. In FIG. 5C, vertical lines 164 indicate the positions of breakpoints. It will be seen from FIG. 5C that the minimum measure takes into consideration the relative depth of the local minima of the SED indicator in comparison to the surrounding plateau, and also smoothes the SED indicator to eliminate the many peaks and valleys after frame no. 350. The breakpoint detection block 100 uses the minimum measure to determine candidate breakpoints by finding the locations of the positive peaks therein.

If desired, an additional or alternative method for identifying breakpoints is by determining locations of rapid changes in the valid pitch estimate across frames. The rate of change in pitch at a given frame can be determined from examination of the pitch changes in surrounding frames. For example, if $p_i$ is the pitch estimate at frame i, the rate of change is can be estimated as being proportional to $$\sum_{k=-r}^{r} k p_{i+k}$$

where the parameter r determines the size of the neighborhood in the past and future frames used to determine the pitch change. An example choice might be r=3. Larger values are less influenced by noise or pitch mis-estimations, but on the other hand will have less temporal resolution.

The confidence measure 110 for each candidate breakpoint is preferably a weighted sum of four numbers. The first number is large if the absolute value of the SED indicator is "small" in the neighborhood of the breakpoint, e.g., less than about 75% of the average value over the input waveform. The second number is large if the minimum measure in the vicinity of the breakpoint is "large", e.g., larger than about 80% of the maximum value over the input waveform. The third number is large if the rate of change of pitch at the breakpoint is "large", e.g., more than about 10 semitones per second. The fourth number is large if the average energy in frames around the breakpoint is "small", e.g. less than 50% of the maximum value in some neighborhood around the candidate breakpoint. Preferably, each of these numbers is weighted equally, although a variety of weightings may be used in the alternative.

At block 115, only those breakpoint candidates 105 with confidence measures 110 exceeding a certain "threshold" are retained, e.g., 0.45. This yields the final note breakpoints 125, which delineate the notes and their beat durations, and final confidence measures 120.

At block 115, a confidence measure 122 is also associated with each note identified between two breakpoints 125. This confidence measure is designed to indicate the possibility that the identified note does not contain more than one note from the input melody, due to a missed breakpoint in the breakpoint detection block 100. The note confidence measure 122 is a weighted sum of four numbers. The first number is small if the variation of the SED indicator for frames within the note is "large," e.g., the difference between the maximum and minimum value is greater than some percentage (e.g. 20%) of the average value. The second number is small if the maximum "minimum measure" taken over all frames in the note is large, e.g. greater than 20% of the maximum value over the input waveform. The third is small if the variation of the identified pitch periods for frames inside the note is large; e.g. the maximum and minimum values vary by more than one semitone. The fourth is small if the variation in the energy level for frames inside the note is "large"; e.g. the difference between the maximum and minimum value is larger than some percentage (e.g. 20%) of the average value. Note that the dependence of the note confidence measure on the SED indicator, minimum measure and identified pitch is opposite that for the breakpoint confidence measure. This is because the breakpoint confidence measure indicates the confidence that a breakpoint was not mistakenly added. On the other hand, the note confidence measure indicates the confidence that a breakpoint was not mistakenly deleted.

At block 130, the pitch for each note is determined by merging the pitch periods across the frames falling between two breakpoints delineating that note. It is preferred to merge the pitch by finding the median of the pitch estimates between the two breakpoints. The median computation is less sensitive than the average to occasional large errors in the pitch estimates at individual frames. This yields the note pitch 135.

The differential note and timing file 150 is generated by block 140. The pitch ratio and the beat duration ratio are expressed as the log of the ratio between two consecutive notes which are given as follows:

$$RF_i = \log_2\left(\frac{F_{i+1}}{F_i}\right)$$

where $F_i$ and $F_{i+1}$ are the pitch frequencies of notes i and i+1, respectively, $$RT_i = \log_2\left(\frac{T_{i+1}}{T_i}\right)$$

where $T_i$ and $T_{i+1}$ are the beat durations of notes i and i+1, respectively.

From the foregoing segmentation and pitch estimation, useful information has been extracted about the input melody. However, this information may contain errors as the user may vocalize or play some notes in an incorrect pitch or with incorrect beat duration. The note-matching engine has the capability and flexibility to tolerate errors in both notes and beats, as discussed next.

3. Note-Matching Engine

The note-matching engine 16 (FIG. 1) is a score-based engine. It generates a score for each song in the reference database 14 based on the similarity of the input melody input to the songs in the database, taking into account the confidence levels of each identified breakpoint and each extracted note. By using dynamic programming the engine 16 attempts to compensate for errors generated either by the user, who may have vocalized or played the melody with wrong notes or wrong beats, or by the melody-note conversion subsystem 12, which may miss some notes, over-count notes or measure the note duration incorrectly.

Instead of using absolute beat and note information, the preferred embodiment uses relative beat and note information for the matching process because the user may vocalize or play the melody in any scale, and not necessarily the 12-tone octave scale. Similarly, the user may vocalize or play the melody in any tempo. Therefore, relative pitch and beat data is preferred.

The inputs to the matching engine 16 are the differential note and timing file 150 and candidate differential note and timing files from the music database 14. To compensate for the insertion and deletion errors caused by the user or the conversion subsystem 12, it is desirable to find the likelihood of matching instead of an exact match between two files. This problem is similar to the classical longest common subsequence problem in which two strings are given and a maximum length common subsequence of these two strings is found. The note-matching engine 16 employs a dynamic programming approach described below to solve this problem in an optimal manner.

Figure 10:
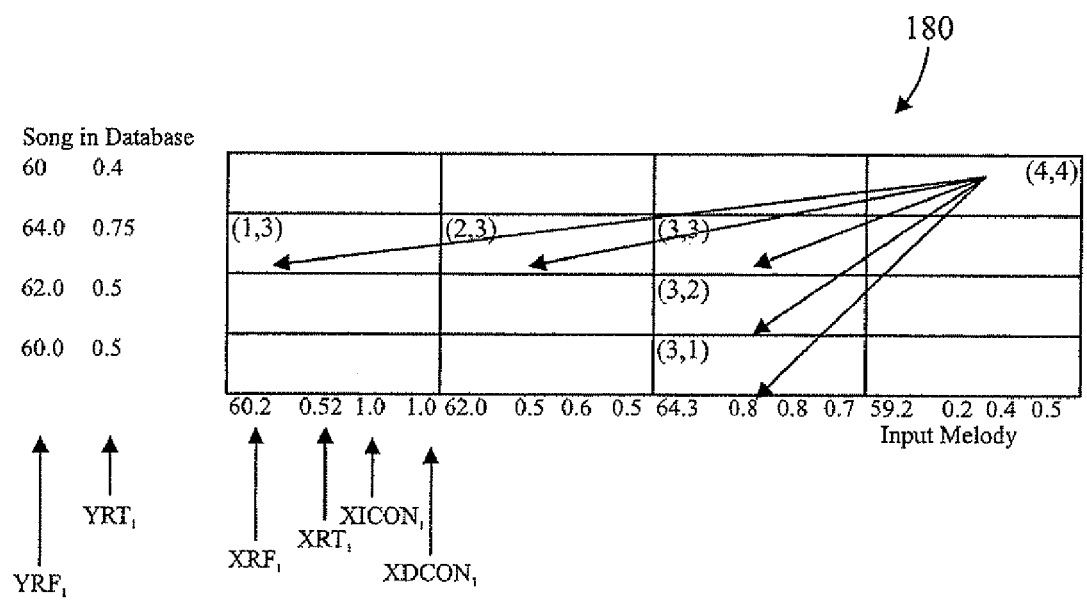
FIG. 10 is a schematic diagram illustrating a process for matching notes.

The engine 16 sets up a 2-dimensional matrix 180 for each song matching, as exemplified in FIG. 10. The Y-axis of the matrix 180 represents a string $Y=(Y_1, Y_2, \ldots, Y_m)$ from the differential note and timing file of the candidate song where each entry $Y_i$ is a tuple or vector ($YRF_i$, $YRT_i$). YRF represents the pitch ratio and YRT represents the beat duration ratio of the corresponding entry. The X-axis of the matrix 180 represents a string $X=(X_1, X_2, \ldots, X_n)$ from the differential note and timing file 150 generated by the note conversion subsystem 12. Each entry $X_i$ is a 4-tuple or vector ($XRF_i$, $XRT_i$, $XICON_i$, $XDCON_i$) where XRFi, $XRT_i$, $XICON_i$ and $XDCON_i$ represent the pitch ratio, the beat duration ratio, the confidence level of the note breakpoint, and the confidence level of the note preceding the breakpoint, respectively.

The cost of a matching between an entry in X and an entry in Y is defined as the weighted sum of the absolute difference between the corresponding RF and RT. For example, the cost of matching $Y_j$ and $X_i$ is equal to $$\text{match\_cost}(X_i, Y_j) = \alpha|YRF_j - XRF_i| + \beta|YRT_j - XRT_i|$$

where $\alpha$ and $\beta$ are the relative weights of pitch and beat duration ratios, respectively. The cost reflects the error of matching $X_i$ with $Y_j$. If an entry Xi in X is perfectly matched with an entry $Y_j$ in Y, the cost of match is equal to zero. The objective of the song-matching algorithm is to find the subsequence of Y with the minimum matching cost with X. The score of matching is thus the cost of matching. The lower the score, the better the match. If there is no insertion or deletion error in the input differential note and timing file 150, then the cost of matching the string $(X_1, X_2, \ldots, X_n)$ with a sub-string $(Y_j, \ldots, Y_{j+n-1})$ in Y is given by the following recursive formula:

$$\begin{aligned}\min\_\text{match\_cost}((X_1, X_2, \ldots, X_n),(Y_j, \ldots, Y_{j+n-1})) = \\ \text{match\_cost}(X_n, Y_{j+n-1}) + \min\_\text{match\_cost}((X_1, \\ X_2, \ldots, X_{n-1}),(Y_j, \ldots, Y_{j+n-2})).\end{aligned}$$

In practice, the j index may range from 1 to m−n+1 (where m is the total number of notes in Y). The lowest value of min_match_costs( ) (as j ranges from m−n+1) is selected as the score for the candidate song.

However insertion or deletion errors may happen. To compensate for this the engine 16 allows for matching with note insertions or note deletions. If there is an insertion before note $X_n$, the cost of matching is given by:

$$min\_match\_cost((X_1,X_2,\ldots,X_n),(Y_j,\ldots,Y_{j+n-1})) = \\ match\_cost(X_n,Y_{j+n-1}) + min\_match\_cost((X_1, X_2,\ldots,X_{n-2}),(Y_j,\ldots,Y_{j+n-2})).$$

For k number of insertions, the cost of matching is given by:

$$min\_match\_cost((X_1,X_2,\ldots,X_n),(Y_j,\ldots,Y_{j+n-1})) = \\ match\_cost(X_n,Y_{j+n-1}) + min\_match\_cost((X_1, X_2,\ldots,X_{n-k-1}),(Y_j,\ldots,Y_{j+n-2})).$$

If there is a deletion before the note $X_n$, the cost of matching is given by:

$$min\_match\_cost((X_1,X_2,\ldots,X_n),(Y_j,\ldots,Y_{j+n-1})) = \\ match\_cost(X_n,Y_{j+n-1}) + min\_match\_cost((X_1, X_2,\ldots,X_{n-1}),(Y_j,\ldots,Y_{j+n-3})).$$

For k number of deletions, the cost of matching is given by:

$$min\_match\_cost((X_1,X_2,\ldots,X_n),(Y_j,\ldots,Y_{j+n-1})) = \\ match\_cost(X_n,Y_{j+n-1}) + min\_match\_cost((X_1, X_2,\ldots,X_{n-1}),(Y_j,\ldots,Y_{j+n-K-2})).$$

Insertion and deletion are not the norm. So, the matching process, although it allows for insertion and deletion, also adds a penalty term when the engine 16 tries to match notes assuming there are k insertions or deletions. However, the conversion subsystem 12 provides a confidence level for every breakpoint and every note that indicates how likely the breakpoint is a "correct" breakpoint and how likely the note is a "correct" note. A low breakpoint confidence level means that the transition is likely to be a wrong transition and hence may result in an insertion error. So a low breakpoint confidence level also implies the note is likely to be an insertion. A low note confidence level means that the note is likely to be composed from several notes and breakpoints are mistakenly deleted. Therefore, when a low note confidence level is encountered, there is a higher chance that a deletion error occurred. (In other words, the breakpoint confidence level reflects note insertion error and the note confidence level reflects note deletion error.) Hence, if the note is matched assuming there is an insertion or deletion error, the penalty should be lowered. For this reason the engine 16 adjusts the penalty by weighting it with the breakpoint and note confidence levels. A breakpoint that is associated with a low confidence level is more likely to be an insertion and hence incurs a lower penalty during matching for note insertion. A note that is associated with a low confidence level is more likely to be a deletion and hence incurs a lower penalty during matching for note deletion. The above min_match_cost calculations are updated as follows:

For k insertions:

$$min\_match\_cost((X_1, X_2, \ldots, X_n), (Y_j, \ldots, Y_{j+n-1})) = \\ match\_cost(X_n, Y_{j+n-1}) + \\ min\_match\_cost((X_1, X_2, \ldots, X_{n-k-1}), (Y_j, \ldots, Y_{j+n-2})) + \\ \sum_{i=1}^{k}(\text{penalty of the } i^{th} \text{ insertion}) * \\ (\text{the corresponding } i^{th} \text{ breakpoint's confidence level})$$

For k deletions:

$$min\_match\_cost((X_1,X_2,\ldots,X_n),(Y_j,\ldots,Y_{j+n-1})) = \\ match\_cost(X_n,Y_{j+n-1}) + min\_match\_cost((X_1, X_2,\ldots,X_{n-1}),(Y_j,\ldots,Y_{j+n-2})).+(\text{penalty of k deletions})*(\text{the corresponding note's confidence level})$$

Based on the recursive structure of the minimum matching cost calculation, a dynamic programming approach is used to implement the note-matching algorithm. FIG. 10 illustrates the above cost calculation. This figure shows the first 4×4 matrix for a song in a database being compared against a four-note hummed melody. The note matching engine 16 operates in a reverse direction, i.e., the last note of the hummed melody is considered first against the latest notes of the song. For each matrix point, the engine 16 seeks a preceding 20 note having the lowest cost, which translates into highest similarity in relative pitch, relative beat duration and confidence level. At matrix point (4,4) the engine 16 considers the following possibilities:

| Direction | Matrix Point | Meaning | Cost Calculation |
|---|---|---|---|
| (−1, −1) | (3, 3) | Notes and beats are normal sequence, i.e., no insertions or deletions | $\alpha\|64.0 - 64.3\| + \beta\|0.75 - 0.80\|$ |
| (−1, −2) | (3, 2) | Note is missing in hummed melody | $\alpha\|62.0 - 64.3\| + \beta\|0.5 - 0.80\| + (\text{cost of 1 deletion}) * 0.7$ |
| (−1, −3) | (3, 12) | Two notes are missing in hummed melody | $\alpha\|60 - 64.3\| + \beta\|0.5 - 0.8\| + (\text{cost of 2 deletions}) * 0.7$ |
| (−2, −1) | (2, 3) | Extra note is added/inserted in hummed melody | $\alpha\|64 - 62\| + \beta\|0.75 - 0.5\| + (\text{cost of } 1^{st} \text{ insertion}) * 0.8$ |
| (−3, −1) | (1, 3) | Two extra notes added/inserted in hummed melody | $\alpha\|64 - 60.2\| + \beta\|0.75 - 0.52\| + (\text{cost of 1st insertion}) * 0.8 + (\text{cost of } 2^{nd} \text{ insertion}) * 0.6$ |

It will thus be seen from the foregoing that at a matching point $(X_i, Y_j)$ in the matrix formed by X and Y, the engine 16 searches for a preceding set of notes $\{(X_{i-1-k}, Y_{j-1})(X_{i-1}, Y_{j-1-k})\}$ $0 \leq k \leq max_k$, which minimize a match cost defined as follows:

If k=0, $$\alpha|YRF_j - XRF_{u-1}| + \beta|YRT_{j-1} - XRT_{i-1}|,$$

else if k>0, $$\alpha|YRF_{j-1} - XRF_{i-1-k}| + \beta|YRT_{j-1} - XRT_{i-1-k}| + \\ \sum_{m=0}^{k-1}(\text{penalty for the}(m+1)^{th} \text{ insertion}) * XICON_{i-1-m} \text{ or}$$

-continued
$$\alpha |YRF_{j-1-k} - XRF_{i-1}| + \beta |YRT_{j-1-k} - XRT_{i-1}| +$$
$$(\text{penalty for } k \text{ deletions}) * XDCON_{i-1}$$

where $\alpha$ and $\beta$ are weights.

4. Utility

The melody retrieval system 10 can be used in, but is not limited to, the following applications:

Intelligent user interface of a music jukebox. Thousands of songs are typically stored inside a typical jukebox. To select a song from this large database is sometimes not an easy task using the traditional input method. Using the melody retrieval system 10, the user can hum a few notes and the system will search through all the songs stored in the jukebox and then output the songs that most closely match the humming melody. The user can then pick the song he or she wants. This system can be extended beyond the jukebox application to many consumer audio entertainment products that store songs, such as portable music players like MD™ player, Walkman™, Discman™, MP3™ portable player, and others.

A tool to search for a song or music piece on the Internet. The music retrieval system 10 can be used as an Internet music-searching engine similar to a conventional text-based web page searching engine. The user hums the melody and the tool can initiate a search in an online music database. Such a tool can also preferably spawn multiple searches in multiple databases. The results of the parallel search can be consolidated, sorted and output according to the matching scores. The output may also be a hypertext link such that the user can directly select the song he or she wants and connect to the web site that stores the song for purchasing or downloading.

A tool to help cellular phone users to download songs from cellular phone or wireless content providers. The next generation mobile phones (e.g. 3G cellular phone) not only support high bit rate transmission but also have the local digital signal processing power to decode digitally-compressed audio format such as MP3. However it may be difficult for users to select songs from the mobile phone due to the small numerical keypad interface and small LCD screen. The music retrieval system 10 can be employed to enable the user to hum a melody into the mobile phone which can then transmit the input melody back to the base station where the system 10 is preferably located. Once the note-matching engine 16 finishes the matching process the output subsystem 18 can transmit a list of the top-ranked songs back to the user. The list can be displayed on the screen of the mobile phone for the user to select the song to download.

Password protection. Rather than having a text-based password protection mechanism to access user accounts and the like, a query based on humming can be employed in the alternative.

5. Variants

Figure 6A:
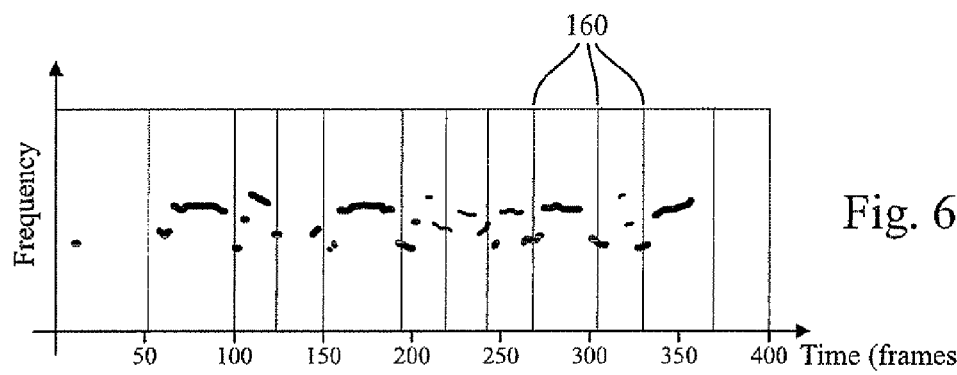
FIG. 6A is identical to FIG. 4A (and provided on the same drawing sheet as FIGS. 6B and 6C for reference purposes)
Figure 6B:
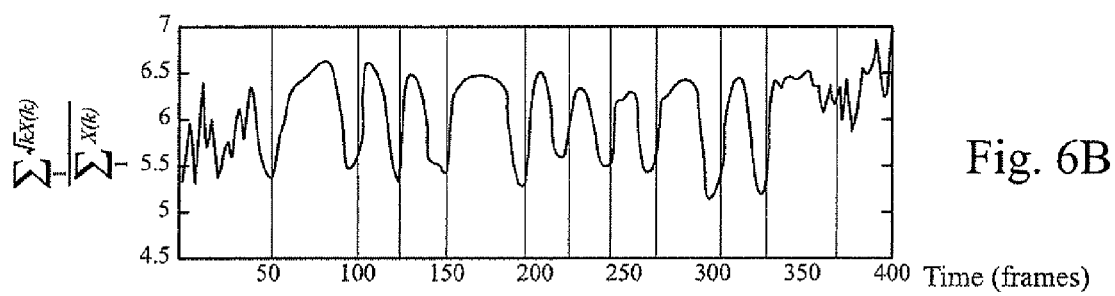
FIG. 6B is a graph of a spectral energy distribution indicator, computed in a second manner, which is based upon the spectrogram of FIG. 6A.
Figure 6C:
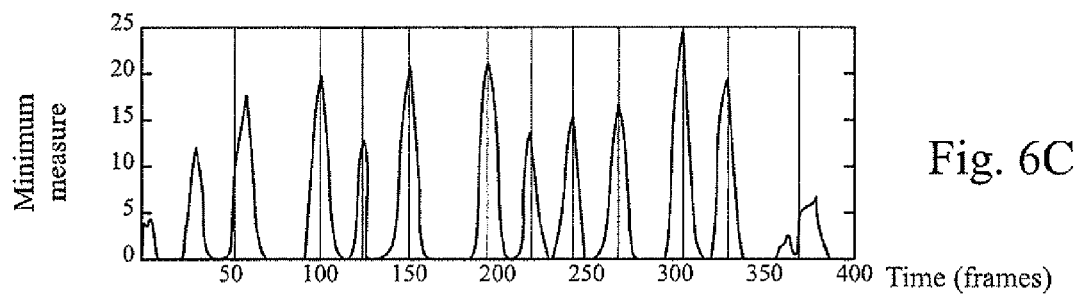
FIG. 6C is a graph of a "minimum measure", as discussed in greater detail below, which is based on the spectral energy distribution indicator shown in FIG. 6B.

One aspect of the invention is concerned with estimating or determining breakpoints based on changes in the spectral energy distribution of the input melody. One implementation of the SED indicator has been described. There are alternative ways of computing the SED indicator which nevertheless yield similar properties to the above-described implementation. One broad class of SED indicators is defined by $$\frac{\sum_k f(k)g(X(k))}{\sum_k g(X(K))}$$

where $f(k)$ and $g(X(k))$ are non-negative and non-decreasing functions of k and $X(k)$, respectively. The previously described implementation of the SED indicator used $f(k)=k$ and $g(X(k))=X(k)$. However, other choices can produce similar results. For example:

FIGS. 6A-6C show plots similar to FIGS. 5A-5C where the SED indicator is defined according to $$\frac{\sum_k \sqrt{k}\, X(k)}{\sum_k X(k)},$$

i.e., $f(k)=\sqrt{k}$ and $g(X(k))=X(k)$.

Figure 7A:
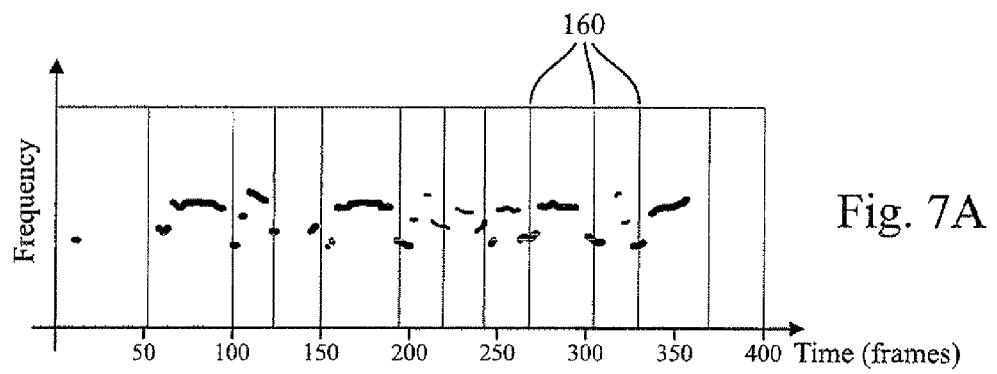
FIG. 7A is identical to FIG. 4A (and provided on the same drawing sheet as FIGS. 7B and 7C for reference purposes)
Figure 7B:
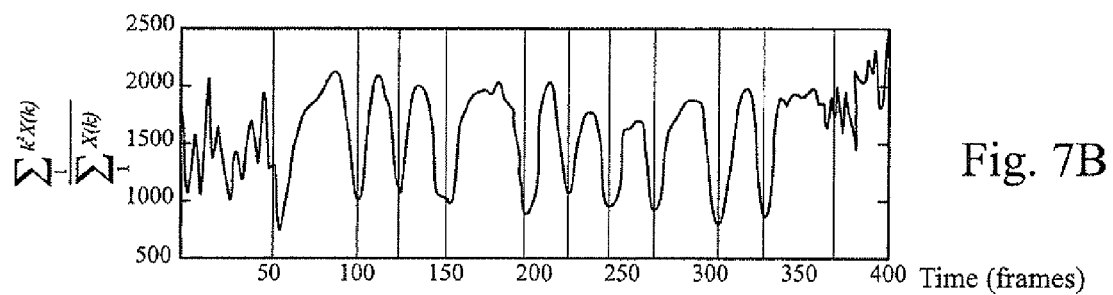
FIG. 7B is a graph of a spectral energy distribution indicator, computed in a third manner, which is based upon the spectrogram of FIG. 7A.
Figure 7C:
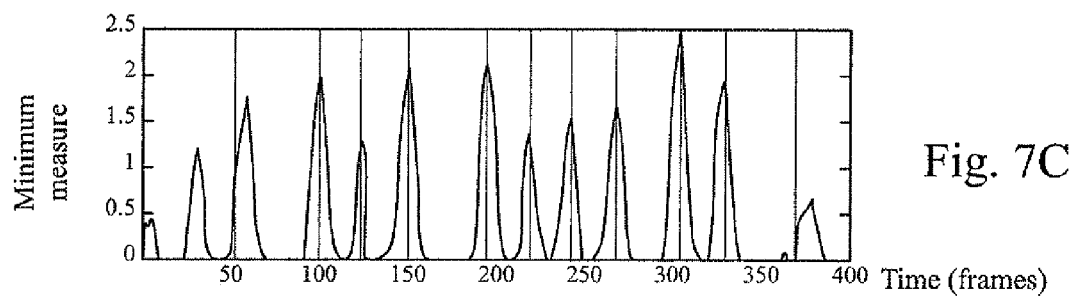
FIG. 7C is a graph of a "minimum measure", as discussed in greater detail below, which is based on the spectral energy distribution indicator shown in FIG. 7B.

FIGS. 7A-7C show plots similar to FIGS. 5A-5C where the SED indicator is defined according to $$\frac{\sum_k k^2 X(k)}{\sum_k X(k)},$$

i.e., $f(k)=k^2$ and $g(X(k))=X(k)$.

Figure 8A:
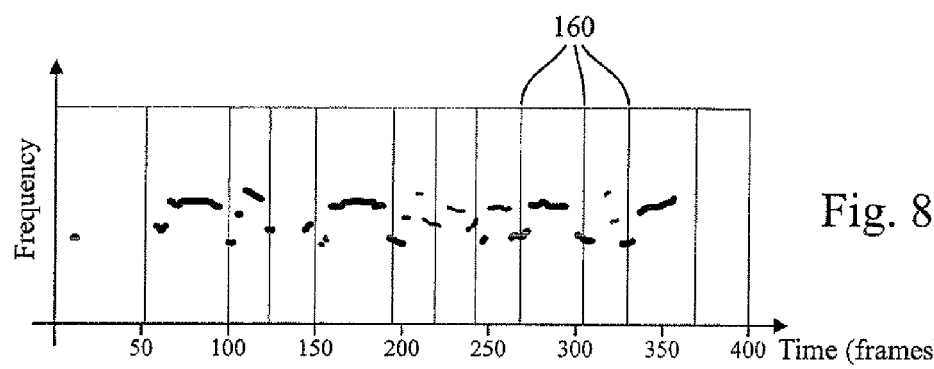
FIG. 8A is identical to FIG. 4A (and provided on the same drawing sheet as FIGS. 8B and 8C for reference purposes)
Figure 8B:
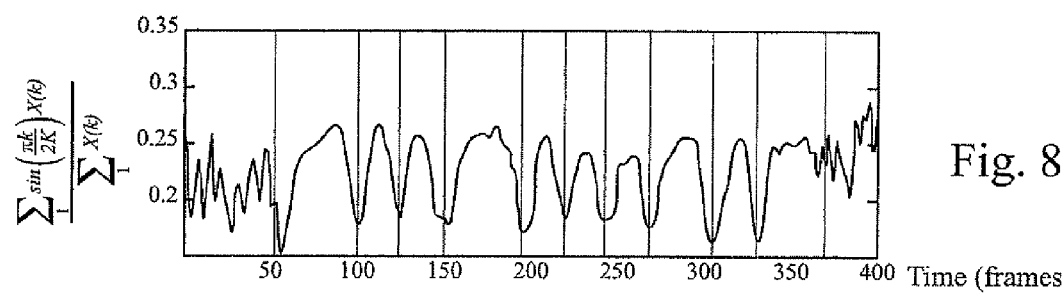
FIG. 8B is a graph of a spectral energy distribution indicator, computed in a fourth manner, which is based upon the spectrogram of FIG. 8A.
Figure 8C:
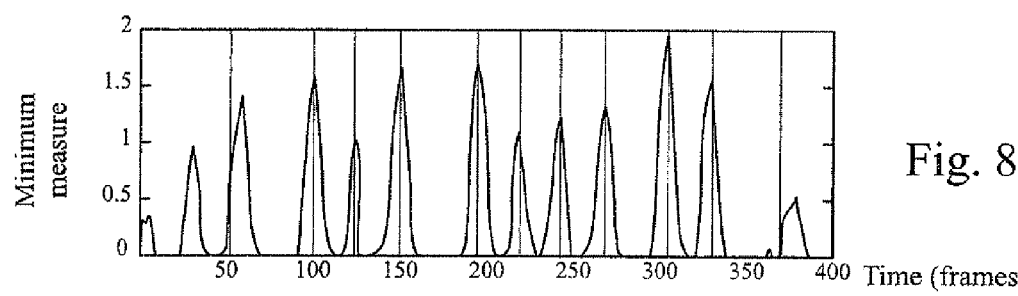
FIG. 8C is a graph of a "minimum measure", as discussed in greater detail below, which is based on the spectral energy distribution indicator shown in FIG. 8B.

FIGS. 8A to 8C show plots similar to FIGS. 5A-5C where the SED indicator is defined according to $$\frac{\sum_k \sin\left(\frac{\pi k}{2K}\right) X(k)}{\sum_k X(k)},$$

where K is the frequency bin corresponding to the Nyquist frequency, i.e., $$f(k) = \sin\left(\frac{\pi k}{2K}\right)$$

and $g(X(k))=X(k)$.

Figure 9A:
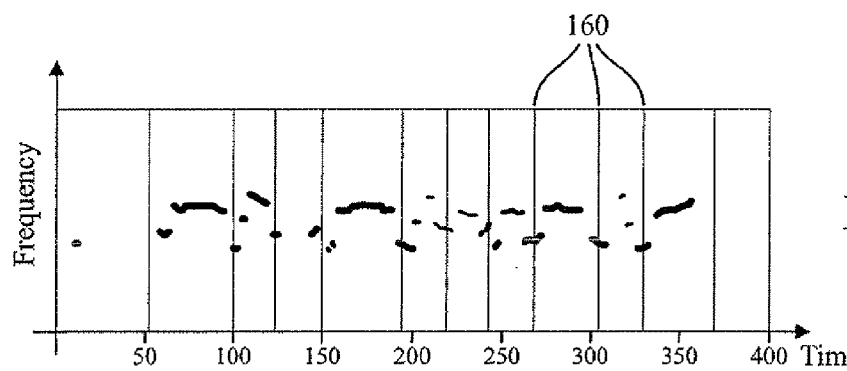
FIG. 9A is identical to FIG. 4A (and provided on the same drawing sheet as FIGS. 9B and 9C for reference purposes)
Figure 9B:
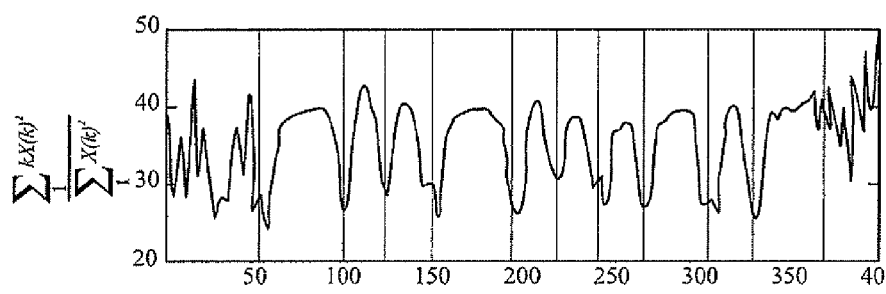
FIG. 9B is a graph of a spectral energy distribution indicator, computed in a fifth manner, which is based upon the spectrogram of FIG. 9A.
Figure 9C:
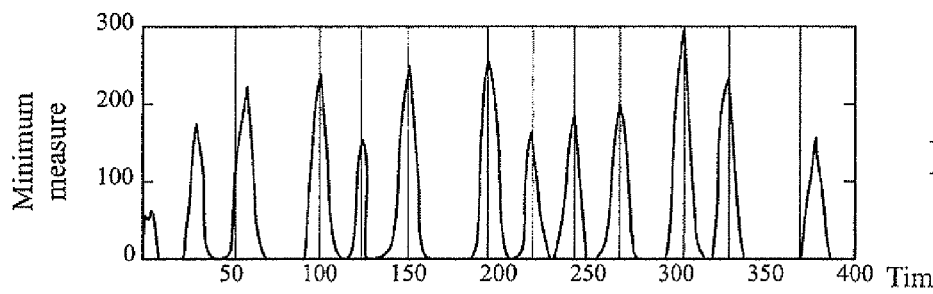
FIG. 9C is a graph of a "minimum measure", as discussed in greater detail below, which is based on the spectral energy distribution indicator shown in FIG. 9B.

FIGS. 9A-9C show plots similar to FIGS. 5A-5C where the SED indicator is defined according to $$\frac{\sum_k k X(k)^2}{\sum_k X(k)^2},$$

i.e., $f(k)=k$ and $g(X(k))=X(k)^2$.

In the preferred embodiment, the SED) indicator is defined so that it achieves large values if the energy spectrum is concentrated in high frequencies and small values if the energy spectrum is concentrated at low frequencies. An inverse relationship may be employed. Also, alternative embodiments may choose different frequency ranges, such as achieving large values within a band or bands of frequencies and low values outside that band or bands. This might be done to differentiate other types of breakpoints.

It should also be appreciated that the SED indicator need not be computed from the energy spectrum. For example, the SED indicator illustrated in FIG. 5A could be computed by estimating the slope at the origin of the auto-correlation of each frame and normalizing that slope by the value at the origin. This is due to the fact that the auto-correlation and the energy spectrum are Fourier Transform pairs, and thus contain the same information.

Many examples have been given for the various parameters used in the spectral analysis techniques discussed herein. This is done for the purpose of illustration only and not intended to be limiting. Without limiting the generality of the foregoing, these examples includes: the "largest" auto-correlation peaks; the "closeness" of pitch candidates to other pitch estimates; the "nearness" of frames to a local minimum in the SED indicator; the "depth" of the local minimum; the "smallness" of the absolute values of the SED indicators; the "largeness" of the minimum measure in the vicinity of a breakpoint; the "largeness" of the rate of change of pitch; and the "threshold" for the confidence measure. As will be appreciated by those skilled in this art, a wide range of crisp values can used to implement what are essentially fuzzy logic concepts.

The preferred embodiment has been presented in a system block diagram format, but in practice the invention may be implemented in software or hardware, or a combination of both. Similarly, those skilled in the art will understand that numerous other modifications and variations may be made to the embodiments disclosed herein without departing from the spirit or scope of the invention.

We claim:

1. A method of retrieving at least one entry from a music database, wherein each of said entries is associated with a sequence of pitches and beat durations, said method comprising:
   receiving a digitized representation of an input melody;
   identifying breakpoints in said melody in order to define notes therein, each of said notes being delineated by adjacent breakpoints;
   assigning a confidence level to each note or each breakpoint;
   determining a pitch and beat duration for each note of said melody;
   determining a score for each of said entries based on a search which minimizes cost of matching the pitches and beat durations of said melody and said entry, wherein said search considers at least one deletion or insertion error in a selected note of said melody and, in this event, penalizes the cost of matching based on the confidence level of the selected note or a breakpoint associated therewith; and
   presenting said at least one entry to a user based on its score.

2. The method according to claim 1, wherein said pitches and beat durations are relative pitches and relative beat durations.

3. The method according to claim 1, wherein
   the cost of matching a given note Xi of said melody with a given note $Y_j$ associated with said entry is:
   match_cost($X_i$, $Y_j$)=$\alpha|YRF_j-XRF_i|+\beta|YRT_j-XRT_i|$,
   where $YRF_j$ and $YRT_j$ respectively represent the relative pitch and relative beat duration of the note associated with said entry, and
   $XRF_i$ and $XRT_j$ respectively represent the relative pitch and relative beat duration of the note associated with said melody; and $\alpha$ and $\beta$ are weights.

4. The method according to claim 1, wherein:
   a confidence level is assigned to each note and each breakpoint; and
   said search considers deletion and insertion errors for any given note of said melody and, in this event, penalizes the cost of matching based on the confidence level of the given note and the confidence level of a breakpoint associated with the given note.

5. The method according to claim 4, wherein:
   X is a sequence of notes, $X_i$, of said melody, each $X_i$, having components $XRF_i$, $XRT_i$, $XICON_i$, and $XDCON_i$ which respectively represent the relative pitch, relative beat duration, confidence level of the breakpoint and confidence level of the note associated with said melody;
   Y is a sequence of notes, $Y_j$, of said entry, each $Y_j$ having components $YRF_j$ and $YRT_j$ which respectively represent the relative pitch and relative beat duration of the note associated with said entry;
   X and Y form a matrix, and at a matching point $(X_i, Y_j)$ said search seeks to identify a preceding set of notes $\{(X_{i-1-k}, Y_{j-1})(X_{i-1}, Y_{j-1-k})\}$ $0<k<\max_k$, which minimize a match cost defined as follows:
   if k=0, $\alpha|YRF_j-XRF_{i-1}|+\beta|YRT_{j-1}-XRT_{i-1}|$, else if k>0, $$\alpha|YRF_{j-1} - XRF_{i-1-k}| + \beta|YRT_{j-1} - XRT_{i-1-k}| +$$
$$\sum_{m=0}^{k-1} (\text{penalty for the } (m+1)^{th} \text{ insertion}) *$$
$$XICON_{i-1-m} \text{ or } \alpha|YRF_{j-1-k} - XRF_{i-1}| +$$
$$\beta|YRT_{j-1-k} - XRT_{i-1}| + (\text{penalty for } k \text{ deletions}) * XDCON_{i-1}$$

where $\alpha$ and $\beta$ are weights.

6. The method according to claim 1, further comprising:
   segmenting the melody into a series of frames, wherein adjacent breakpoints encompass one or more sequential frames;
   executing at least two of the following three steps,
   (a) computing a spectral energy distribution (SED) indicator for each frame,
   (b) estimating the pitch of each frame, and
   (c) determining the energy level of each frame,
   deriving the confidence levels based on at least two of the following three characteristics, (i) the SED indicator, (ii) changes in pitch, and (iii) the energy level.

7. The method according to claim 6, wherein the confidence level for a given breakpoint is computed as a weighted combination of at least two of three numbers, the first number based on value of the SED indicator in the vicinity of the given breakpoint, the second number being based on a change in pitch in the frames before and after the given breakpoint, and the third number being based on the energy level of the frames in the immediate vicinity of the breakpoint.

8. The method according to claim 6, wherein the confidence level for a given note is computed as a weighted combination of at least two of three numbers, the first number based on value of the SED indicator in the given note, the second number being based on the variation in pitch in the given note, and the third number being based on the energy level of the frames in the given note.

9. The method according to claim 1, further comprising:
   segmenting the melody into a series of frames, wherein adjacent breakpoints encompass one or more sequential frames;

computing a spectral energy distribution (SED) indicator for each frame;

estimating the pitch of each frame; and deriving the confidence levels based on the SED indicator and changes in pitch.

10. The method according to claim 9, wherein the confidence level for a given breakpoint is computed as a weighted combination of a first number based on value of the SED indicator in the vicinity of the given breakpoint and a second number based on a change in pitch in the frames before and after the given breakpoint.

11. The method according to claim 9, wherein the confidence level for a given note is computed as a weighted combination of a first number based on value of the SED indicator within the given note and a second number based on the variation in pitch within the given note.

12. The method according to claim 9, wherein value of the SED indicator for a given frame is relatively large if an energy distribution associated with the frame is concentrated in one or more specified frequency bands.

13. The method according to claim 12, including filtering the melody with a high pass filter prior to segmenting the melody into frames.

14. The method according to claim 13, wherein the energy distribution is determined from a normalized energy spectrum of the frame.

15. The method according to claim 14, wherein the specified frequency band is in the upper portion of a 0-4 kHz frequency range.

16. The method according to claim 1, further comprising:

segmenting the melody into a series of frames, wherein adjacent breakpoints encompass one or more sequential frames;

computing a spectral energy distribution (SED) indicator for each frame;

determining the energy level of each frame; and deriving the confidence levels based on the SED indicator and the energy level.

17. The method according to claim 16, wherein the confidence level for a given break point is computed as a weighted combination of a first number based on value of the SED indicator in the vicinity of the given breakpoint and a second number based on the energy level of the frame in the immediate vicinity of the breakpoint.

18. The method according to claim 16, wherein the confidence level for a given note is computed as a weighted combination of a first number based on value of the SED indicator in given note and a second number based on the energy level of the frames in the given note.

19. The method according to claim 16, wherein value of the SED indicator for a given frame is relatively large if an energy distribution associated with the frame is concentrated in one or more specified frequency bands.

20. The method according to claim 19, including filtering the melody with a high pass filter prior to segmenting the melody into frames.

21. The method according to claim 20, wherein the energy distribution is determined from a normalized energy spectrum of the frame.

22. The method according to claim 21, wherein the specified frequency band is the upper portion of a 0-4 kHz frequency range.

23. An apparatus for retrieving at least one entry from a music database, wherein each of said entries is associated with a sequence of pitches and beat durations, said apparatus comprising:

means for receiving a digitized representation of an input melody;

a melody-to-note conversion subsystem for identifying breakpoints in said melody in order to define notes therein, said subsystem determining a pitch and beat duration for each note of said melody and associating each note or each breakpoint with a confidence level;

a note-matching engine for determining a score for each of said entries based on a search which minimizes cost of matching the pitches and beat durations of said melody and said entry, wherein said search considers at least one deletion or insertion error in a selected note of said melody and, in this event, penalizes the cost of matching based on the confidence level of the selected note or a breakpoint associated therewith; and an output subsystem for presenting said at least one entry to a user based on its score.

24. A method of retrieving at least one entry from a music database, wherein each of said entries is associated with a sequence of pitches and beat durations, said method comprising:

receiving a digitized representation of an input melody;

identifying breakpoints in said melody in order to define notes therein, each of said notes being delineated by adjacent breakpoints;

associating a confidence level with each note pertaining to likelihood that said note contains a note insertion error;

determining a pitch and beat duration for each note of said melody;

determining a score for each of said entries based on a search which minimizes cost of matching the pitches and beat durations of said melody and said entry, wherein said search considers at least one insertion error in a selected note of said melody and, in this event, penalizes the cost of matching based on the confidence level associated with the selected note; and presenting said at least one entry to a user based on its score.

25. A method of retrieving at least one entry from a music database, wherein each of said entries is associated with a sequence of pitches and beat durations, said method comprising:

receiving a digitized representation of an input melody;

identifying breakpoints in said melody in order to define notes therein, each of said notes being delineated by adjacent breakpoints;

associating a confidence level with each note pertaining to likelihood that said note contains a note deletion error;

determining a pitch and beat duration for each note of said melody;

determining a score for each of said entries based on a search which minimizes cost of matching the pitches and beat durations of said melody and said entry, wherein said search considers at least one deletion error in a selected note of said melody and, in this event, penalizes the cost of matching based on the confidence level associated with the selected note; and presenting said at least one entry to a user based on its score.

* * * * *